United States Patent
Niedermeyer

(10) Patent No.: US 11,172,724 B2
(45) Date of Patent: Nov. 16, 2021

(54) HAT WITH REPLACABLE PARACORD CHINSTRAP

(71) Applicant: Peter Grimm Niedermeyer, San Marcos, CA (US)

(72) Inventor: Peter Grimm Niedermeyer, San Marcos, CA (US)

(*) Notice: Subject to any disclaimer, the term of this patent is extended or adjusted under 35 U.S.C. 154(b) by 91 days.

(21) Appl. No.: 16/271,070

(22) Filed: Feb. 8, 2019

(65) Prior Publication Data

US 2020/0253317 A1    Aug. 13, 2020

(51) Int. Cl.
*A42B 7/00* (2006.01)
*A42B 1/02* (2006.01)
*G09B 19/00* (2006.01)
*A42B 1/14* (2006.01)

(52) U.S. Cl.
CPC .................. *A42B 7/00* (2013.01); *A42B 1/02* (2013.01); *A42B 1/14* (2013.01); *G09B 19/00* (2013.01)

(58) Field of Classification Search
CPC ............... A42B 7/00; A42B 1/02; A42B 1/14
USPC ................................................. 2/175.7, 175.8
See application file for complete search history.

(56) References Cited

U.S. PATENT DOCUMENTS

| 1,673,859 | A  | * | 6/1928  | Wittcoff ................. | A42B 1/062 2/10 |
| 5,802,617 | A  | * | 9/1998  | Boden ...................... | A42B 1/22 2/175.1 |
| 6,526,596 | B2 | * | 3/2003  | Anderson ................ | A42B 1/02 2/175.1 |
| 8,375,469 | B2 | * | 2/2013  | Duwyn-Zylstra ...... | A42B 1/206 2/175.1 |
| 2012/0030860 | A1 | * | 2/2012 | Lovitz .................... | A42B 1/004 2/209.13 |
| 2015/0327620 | A1 | * | 11/2015 | Tremoureux ............ | A42B 7/00 2/338 |

* cited by examiner

*Primary Examiner* — Gloria M Hale
(74) *Attorney, Agent, or Firm* — John R. Ross; John R. Ross, III

(57) ABSTRACT

A hat with a replaceable paracord chinstrap. A hat is provided that includes a removably attached paracord chinstrap. A chinstrap adjustment piece is attached to the hat and may be used to adjust the tightness around a wearer's chin. An instruction sheet is provided that includes instructions on how to attach the paracord chinstrap and adjustment piece and how to utilize the paracord chinstrap.

10 Claims, 5 Drawing Sheets

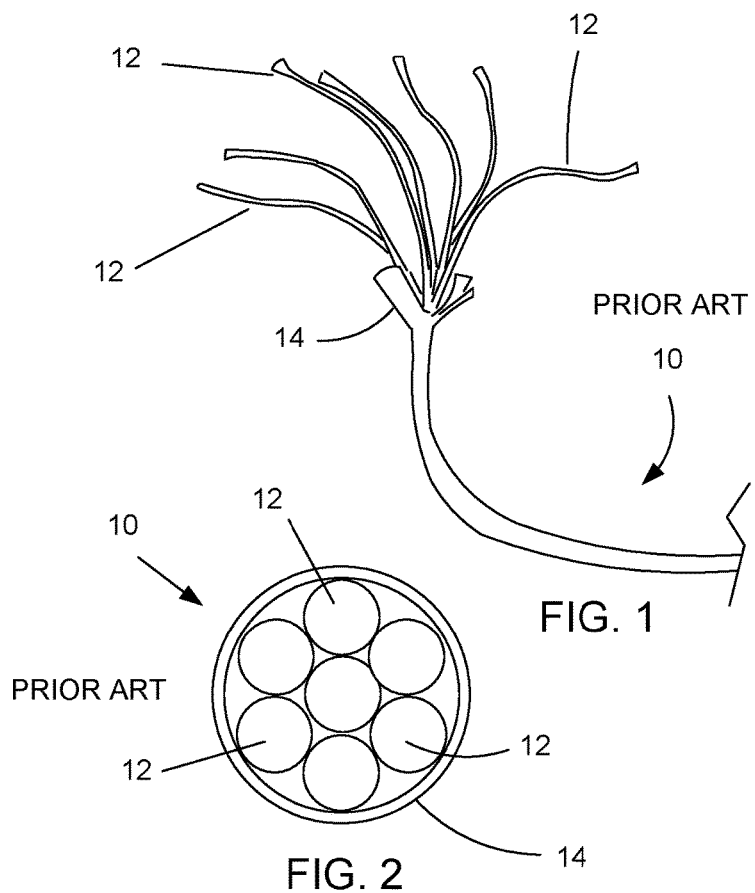
FIG. 1
FIG. 2
FIG. 3

HAT WITH REPLACABLE PARACORD CHINSTRAP

The present invention relates to hats, and in particular, to hats with chinstraps.

BACKGROUND OF THE INVENTION

Parachute cord (also paracord or 550 cord when referring to type-III paracord) is a lightweight nylon kernmantle rope originally used in the suspension lines of parachutes. This cord is useful for many other tasks and is now used as a general-purpose utility cord by both military personnel and civilians.

Paracord includes an inner core protected by a woven outer sheath. The core includes multiple strands that extend longitudinally through the outer sheath. For example, FIGS. 1-3 show prior art 550 paracord 10. The core of paracord 10 is made up of seven strands 12, which are, in turn, made up of three smaller strands each (not shown). Nylon outer sheath 14 is made up of 32 woven strands.

Strands 12 (commonly referred to as "the yarns" or "the guts") can also be removed when finer string is needed, for instance as sewing thread to repair gear, or to be used as fishing line in a survival situation. For applications requiring a thinner or less elastic cord, such as shoelaces, users often remove strands 12 and use the nylon sheath 14 alone. The ends of the cord can be melted and/or crimped to prevent fraying.

Hats are commonly worn by people throughout the world. In recent years, the dangers of sun exposure have become more publicized and are of concern to many. For protection, people will typically wear hats while engaged in outdoor activities such as fishing, hiking or being at the beach.

What is needed is a hat that efficiently and effectively provides protection from the sun as well as provides accessibility to paracord.

SUMMARY OF THE INVENTION

The present invention provides a hat with a replaceable paracord chinstrap. A hat is provided that includes a removably attached paracord chinstrap. A chinstrap adjustment piece is attached to the hat and may be used to adjust the tightness around a wearer's chin. An instruction sheet is provided that includes instructions on how to attach the paracord chinstrap and adjustment piece and how to utilize the paracord chinstrap.

BRIEF DESCRIPTION OF THE DRAWINGS

FIGS. 1-3 show prior art paracord.

DETAILED DESCRIPTION OF THE PREFERRED EMBODIMENTS

Figure 4:
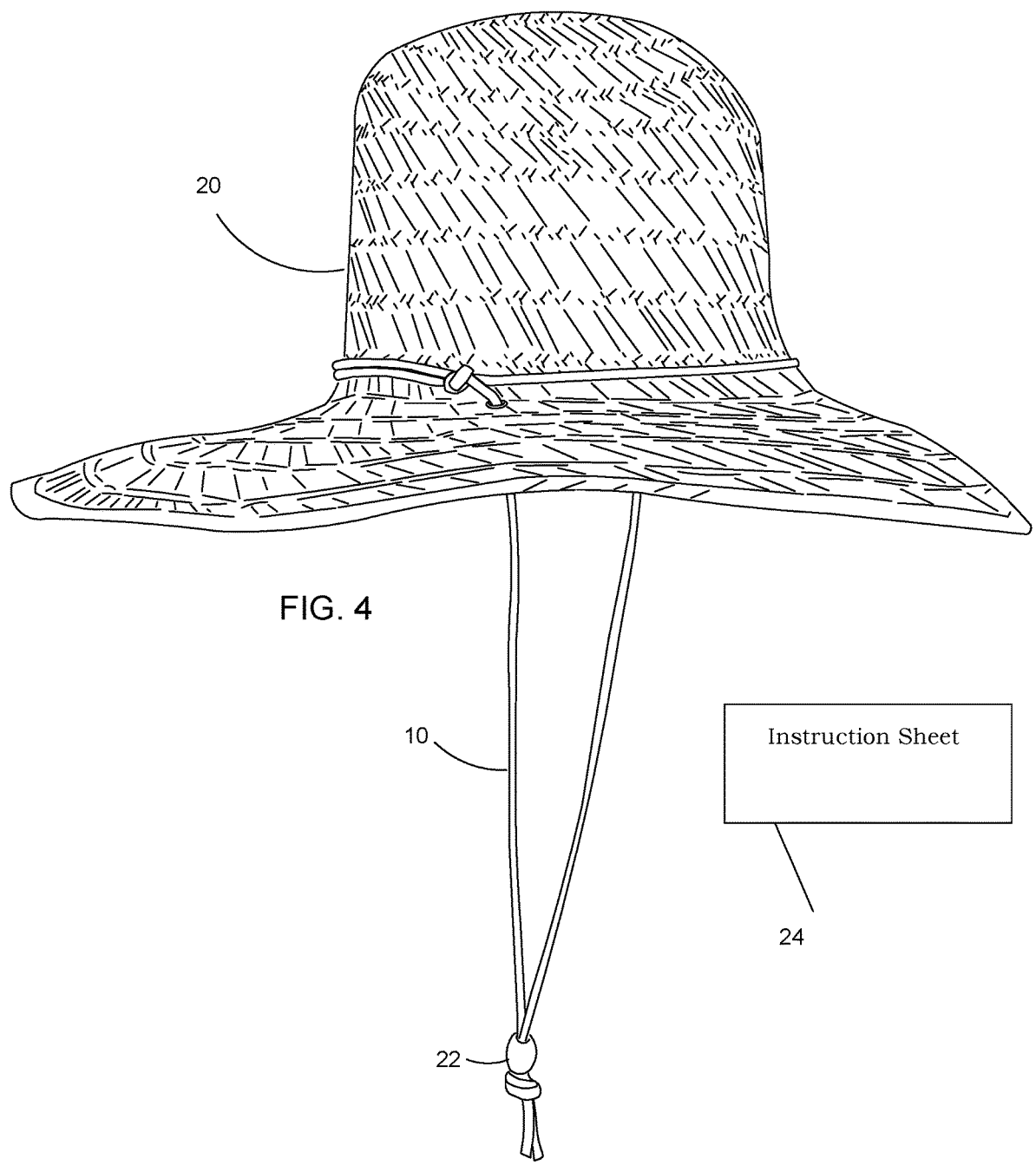
FIG. 4 shows a preferred embodiment of the present invention.

FIG. 4 shows a first preferred embodiment of the present invention. Straw hat 20 is fabricated from straw and includes a wide brim for very good sun protection. Straw hat 20 is popular for usage while engaged in outdoor activities such as being at the beach. Straw hat 20 may also be worn in an official capacity by lifeguards or outdoor workers. Straw hat 20 includes paracord chin strap 110. The tightness around the wearer's chin may be adjusted by utilizing movable chinstrap adjustment piece 22.

In a preferred embodiment, a user is provided with paracord 10, hat 20, adjustment piece 22 and instruction sheet 24. Instruction sheet 24 includes detailed instructions on how to attach paracord chinstrap 110 to hat 20 and how to attach adjustment piece 22 to paracord chinstrap 110. Also, listed on instruction sheet 24 are recommended uses for paracord chinstrap 110.

Some of these uses include the utilization of strands 12 for: fishing line, sewing thread, or thread for stitches in an emergency situation.

In a preferred embodiment, 10 feet of 550 paracord 10 is provided. The user decides how much cord to cut for his chinstrap 110. If the user is fairly confident that he does not need an excessive amount of chinstrap 110, he may cut a 5-foot section so that chinstrap 110 appears as in FIG. 4.

Figure 5:
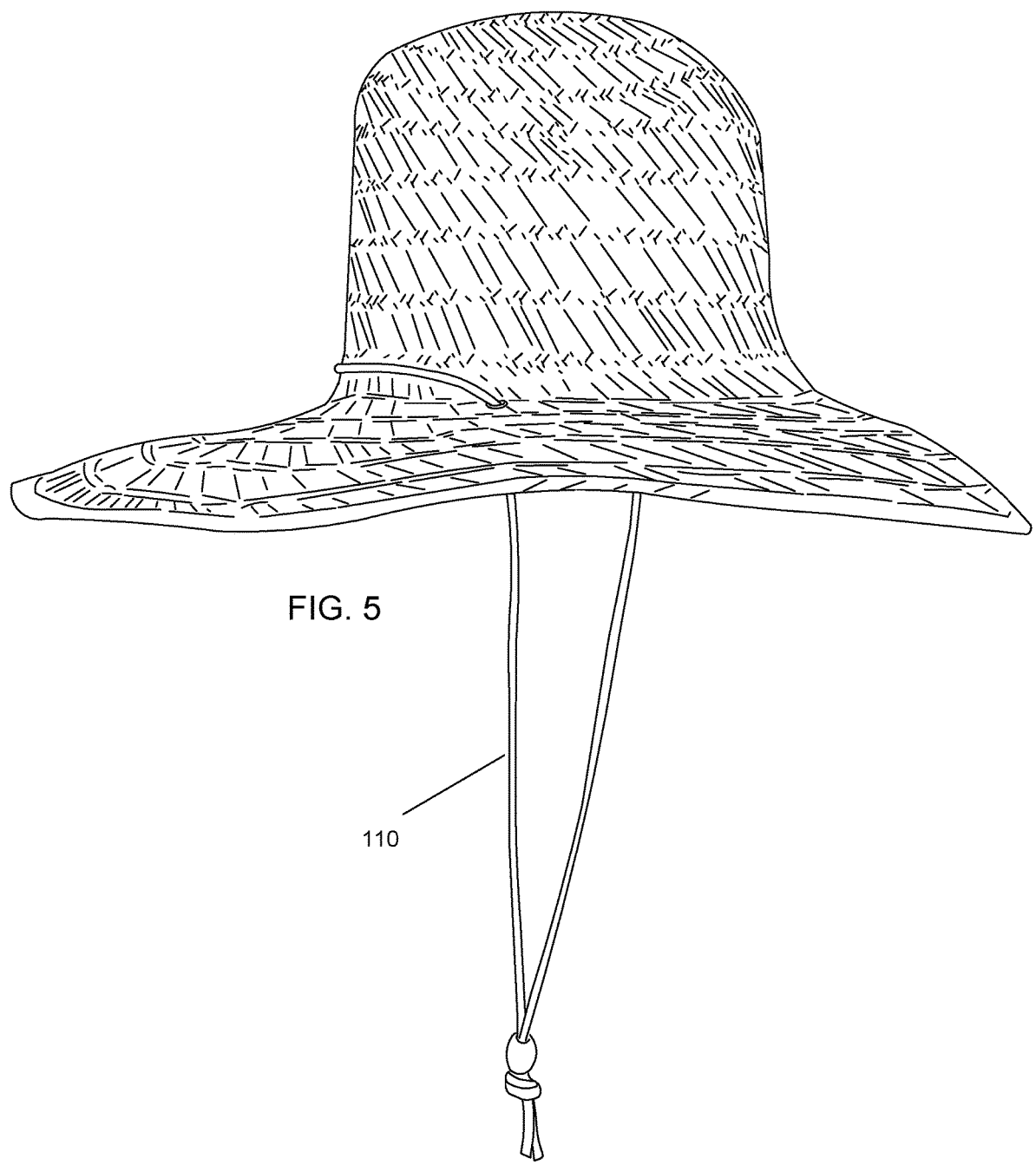
FIG. 5 shows another preferred embodiment of the present invention.

In another preferred embodiment, the user may decide that he prefers to have a very minimal length chinstrap 110 and may cut a 3-foot section so that chinstrap 110 appears as shown in FIG. 5.

Figure 6:
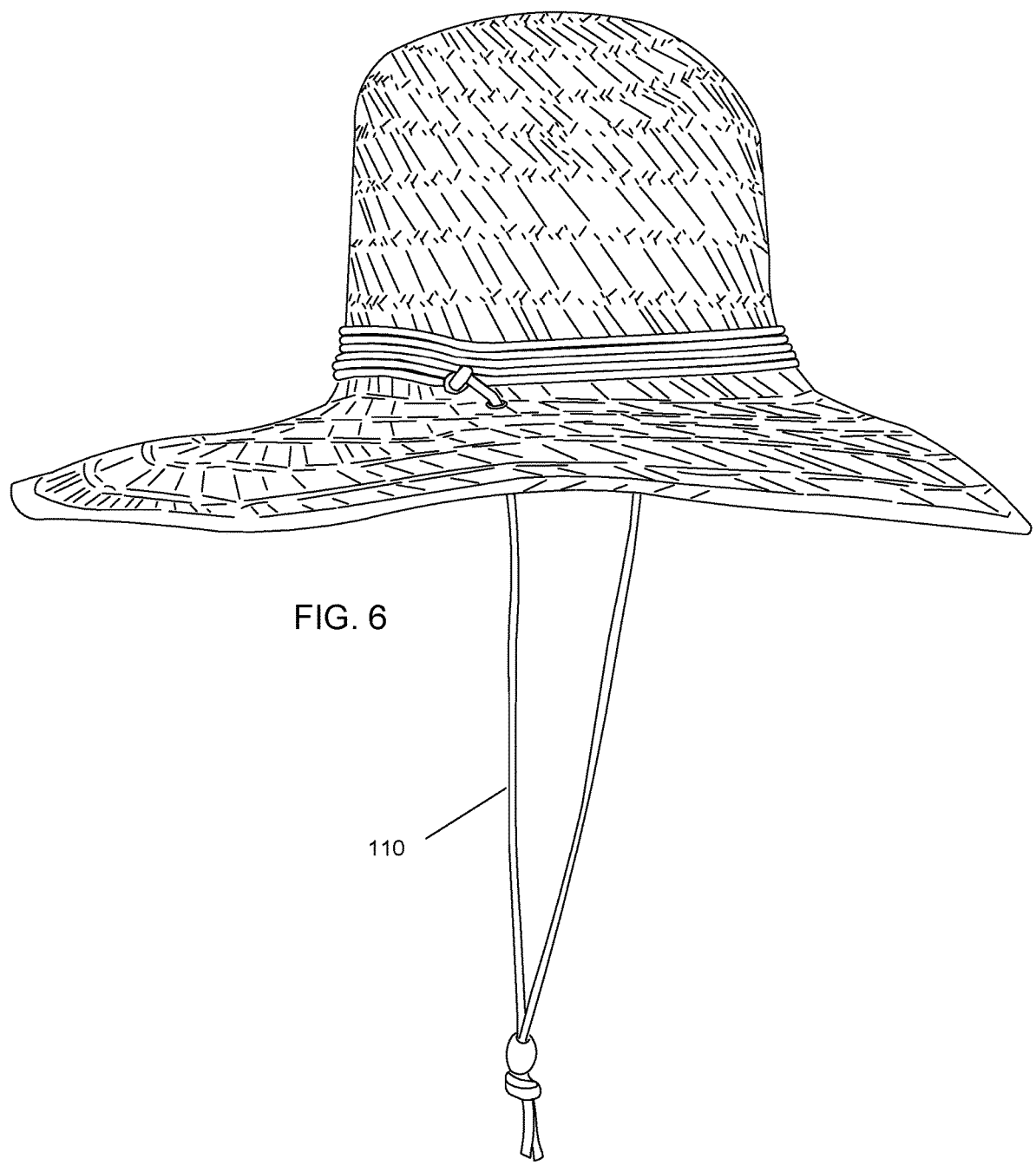
FIG. 6 shows another preferred embodiment of the present invention.

Conversely, in another preferred embodiment, the user may decide that he wishes for a very long chinstrap 110 so as to have maximum flexibility in a potential emergency. FIG. 6 shows a 12-foot section cut from paracord 10 to form chinstrap 110.

In another preferred embodiment instruction sheet 24 includes warranty information on the paracord. For example, the user is instructed that if paracord chinstrap 110 is used for a recommended purpose, that the user will be sent a replacement paracord 10 that may be formed into a replacement paracord chinstrap 110. The replacement paracord may be free, or a fee may be charged. In a preferred embodiment the user is requested to provide the manner in which he used the original paracord chinstrap 110.

Instruction sheet 24 will encourage the user to wear hat 20 and to feel confidence that he has a valuable and replaceable safety device (chinstrap 110) with him while the hat is being worn or nearby.

Figure 7:
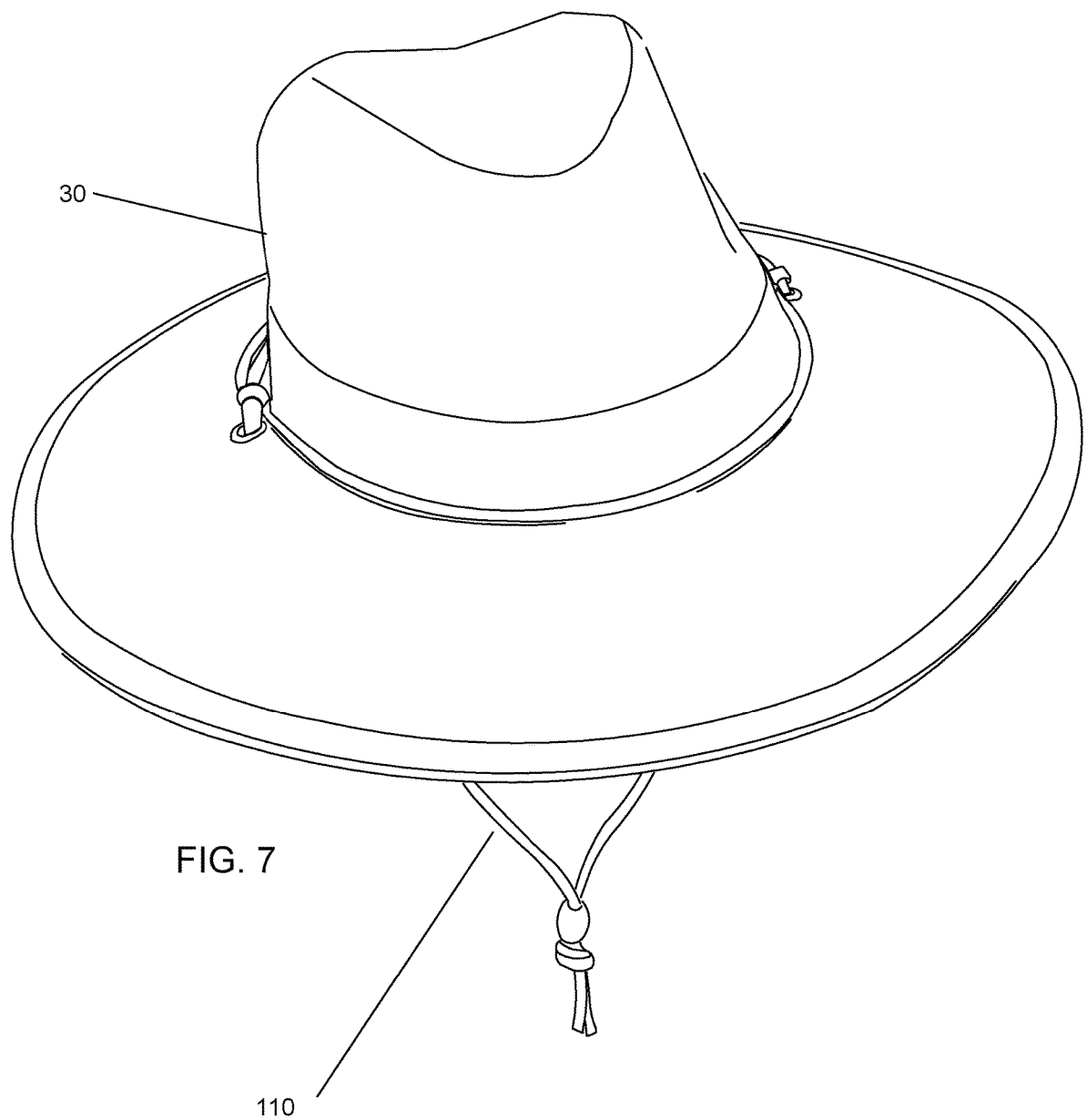
FIG. 7 shows another preferred embodiment of the present invention.

FIG. 7 shows another preferred embodiment of the present invention. Although the above embodiments discussed the utilization of chinstrap 110 with a straw hat, it is possible to use chin strap 110 with other types of hats. For example, FIG. 30 shows the utilization of chinstrap 110 with fabric hat 30.

Fabric hat 30 has a medium sized brim and is more durable than straw. It is popular wear fabric hat 30 while engaged in outdoor activities such as hiking, boating, horseback riding, camping, golfing, and others as well.

Although the above-preferred embodiments have been described with specificity, persons skilled in this art will recognize that many changes to the specific embodiments disclosed above could be made without departing from the spirit of the invention. For example, in one preferred embodiment, instruction sheet 24 is a hangtag that is attached to straw hat 20 when straw hat 20 is purchased. The hangtag includes important information regarding straw hat 20. For example, it may include recommended uses for paracord chinstrap 110. Or it may include instructions on how to attach chinstrap 110 to hat 20. Therefore, the attached claims and their legal equivalents should determine the scope of the invention.

What is claimed is:

1. A hat with a replaceable paracord chinstrap, comprising:
   A. a hat,
   B. a paracord chinstrap removably attached to said hat,
   C. a chinstrap adjustment piece, and
   D. an instruction sheet, providing instructions on how to attach said paracord chinstrap to said hat and said adjustment piece, and providing instructions on how to utilize said paracord chinstrap.

2. The hat as in claim 1, wherein said hat is a straw hat.

3. The hat as in claim 1, wherein said hat is a fabric hat.

4. The hat as in claim 1, wherein said paracord chinstrap is fabricated from 550 paracord and comprises:
   A. a nylon sheath,
   B. seven strands extending longitudinally through said nylon sheath.

5. The hat as in claim 1, wherein said instruction sheet further comprises warranty instructions on obtaining a replacement chinstrap.

6. A method of using a hat with a replaceable paracord chinstrap, comprising the steps of:
   A. obtaining a hat with a replaceable chinstrap, said hat comprising:
      i. a hat,
      ii. a paracord chinstrap removably attached to said hat,
      iii. a chinstrap adjustment piece, and
      iv. an instruction sheet, providing instructions on how to attach said paracord chinstrap to said hat and said adjustment piece, and providing instructions on how to utilize said paracord chinstrap,
   B. cutting said paracord chinstrap to a desired length,
   C. attaching said paracord chinstrap to said hat and said chinstrap adjustment piece,
   D. wearing said hat,
   E. removing said paracord chinstrap from said hat and said chinstrap adjustment piece,
   F. cutting said removed paracord chinstrap to a desired length for usage purpose, and
   G. reattaching said cut paracord chinstrap to said hat or ordering a replacement chinstrap for later attachment to said hat.

7. The method as in claim 6, wherein said hat is a straw hat.

8. The method as in claim 6, wherein said hat is a fabric hat.

9. The method as in claim 6, wherein said paracord chinstrap is fabricated from 550 paracord and comprises:
   A. a nylon sheath,
   B. seven strands extending longitudinally through said nylon sheath.

10. The method as in claim 6, wherein said instruction sheet further comprises warranty instructions on obtaining a replacement chinstrap.

* * * * *